United States Patent
Stern

(10) Patent No.: US 9,304,711 B2
(45) Date of Patent: Apr. 5, 2016

(54) LATENCY REDUCTION IN READ OPERATIONS FROM DATA STORAGE IN A HOST DEVICE

(71) Applicant: Apple Inc., Cupertino, CA (US)

(72) Inventor: Ori Moshe Stern, Modi'in (IL)

(73) Assignee: Apple Inc., Cupertino, CA (US)

( * ) Notice: Subject to any disclaimer, the term of this patent is extended or adjusted under 35 U.S.C. 154(b) by 331 days.

(21) Appl. No.: 13/648,536

(22) Filed: Oct. 10, 2012

(65) Prior Publication Data

US 2014/0101392 A1    Apr. 10, 2014

(51) Int. Cl.
*G06F 12/00* (2006.01)
*G06F 3/06* (2006.01)
*G06F 12/08* (2006.01)

(52) U.S. Cl.
CPC .............. *G06F 3/0674* (2013.01); *G06F 3/061* (2013.01); *G06F 3/0659* (2013.01); *G06F 12/0868* (2013.01)

(58) Field of Classification Search
CPC  G06F 12/023; G06F 12/0866; G06F 12/0868
USPC ........................................................ 711/154
See application file for complete search history.

(56) References Cited

U.S. PATENT DOCUMENTS

| | | | |
|---|---|---|---|
| 6,243,739 B1 | 6/2001 | Schwartz et al. | |
| 6,275,885 B1 * | 8/2001 | Chin et al. | 710/311 |
| 7,130,957 B2 * | 10/2006 | Rao | 711/3 |
| 7,882,260 B2 | 2/2011 | Taylor et al. | |
| 8,051,249 B2 | 11/2011 | Mosek et al. | |
| 2003/0028737 A1 * | 2/2003 | Kaiya et al. | 711/162 |
| 2007/0198764 A1 * | 8/2007 | Risse | G11C 5/04 711/100 |
| 2008/0005541 A1 * | 1/2008 | Hase | G06F 9/4418 712/228 |
| 2008/0022093 A1 * | 1/2008 | Kurien et al. | 713/164 |
| 2010/0191856 A1 | 7/2010 | Gupta et al. | |
| 2012/0254499 A1 * | 10/2012 | Hashimoto | G06F 9/445 711/102 |

OTHER PUBLICATIONS

Definition of parallel retrieved from http://dictionary.reference.com/browse/parallel on Jun. 12, 2015.*

* cited by examiner

*Primary Examiner* — Brian Peugh
*Assistant Examiner* — Prasith Thammavong
(74) *Attorney, Agent, or Firm* — Meyertons, Hood, Kivlin, Kowert & Goetzel, P.C.

(57) ABSTRACT

An apparatus includes a memory and a processor. The processor is configured to send to a storage device a request from an application to retrieve data from the storage device, so as to cause the data to be transferred from the storage device to the memory, to send to the application an acknowledgement that the requested data is available in the memory before the data has been fully transferred from the storage device to the memory, and, when the fetched data is ready in the memory, to provide the data to the application.

12 Claims, 3 Drawing Sheets

LATENCY REDUCTION IN READ OPERATIONS FROM DATA STORAGE IN A HOST DEVICE

FIELD OF THE INVENTION

The present invention relates generally to data storage, and particularly to methods and systems for latency reduction in data read operations in a host device.

BACKGROUND OF THE INVENTION

Host devices communicate with data storage devices in order to exchange data between the storage and the host device. Host devices may comprise, for example, computing devices, tablets, laptops, cellphones and smartphones, which store data on the data storage device.

SUMMARY OF THE INVENTION

An embodiment of the present invention provides an apparatus including a memory and a processor. The processor is configured to send to a storage device a request from an application to retrieve data from the storage device, so as to cause the data to be transferred from the storage device to the memory, to send to the application an acknowledgement that the requested data is available in the memory before the data has been fully transferred from the storage device to the memory, and, when the fetched data is ready in the memory, to provide the data to the application.

In some embodiments, the processor is configured to cause the application to carry out a preparatory action for accessing the data in parallel with transferring the data from the storage device to the memory.

In other embodiments, the processor is configured to designate one or more memory locations in the memory for the fetched data, and to mark the memory locations as invalid upon sending the acknowledgement and the request. In some embodiments, the processor is configured to mark the memory locations as valid after the data has been fully transferred from the storage device to the memory. In yet other embodiments, the processor is configured to provide the data to the application only upon verifying that the memory locations are marked as valid. In some embodiments, the processor is configured to trigger a page fault event upon detecting that the application attempts to access the memory locations while the memory locations are marked as invalid.

There is also provided herein, in accordance with embodiments of the present invention, a method including sending from a processor to a storage device a request from an application to retrieve data from the storage device, so as to cause the data to be transferred from the storage device to a memory coupled to the processor. An acknowledgement is sent from the processor to the application that the requested data is available in the memory before the data has been fully transferred from the storage device to the memory. When the fetched data is ready in the memory, the data is provided to the application.

There is also provided herein, in accordance with embodiments of the present invention, a system including a storage device and a host. The host includes a memory and a processor. The processor is configured to send to the storage device a request from an application to retrieve data from the storage device, so as to cause the data to be transferred from the storage device to the memory, to send to the application an acknowledgement that the requested data is available in the memory before the data has been fully transferred from the storage device to the memory, and, when the fetched data is ready in the memory, to provide the data to the application.

The present invention will be more fully understood from the following detailed description of the embodiments thereof, taken together with the drawings in which:

DETAILED DESCRIPTION OF EMBODIMENTS

Overview

Embodiments of the present invention described herein provide methods and systems for improving the latency in a host device during read operations of data from a data storage device. When an application residing in the host device requests data, a storage driver in the host fetches the data from the data storage and loads it into a memory of the host. The process is initiated with a request sent by the application to retrieve the data from the data storage, which eventually causes the data to be relayed to the memory.

In one possible solution, when the data requested by the application is loaded to the memory, the storage driver sends an acknowledgement to the application that the data is ready to be read. The application can then read the data from the host memory and use it. As can be appreciated, this solution incurs high latency because it is entirely serial. The latency is defined herein as the time between sending an initial request by the application to fetch the data to the time the application accesses the data in the memory.

In the embodiments presented herein, on the other hand, the storage driver sends the acknowledgement to the application as soon as it requests the data storage device to fetch the data, before the data is actually ready in the host memory. In this scheme, preparatory actions in the application can be performed in parallel to the data retrieval in the data storage device. As a result, the overall latency of the process is reduced considerably.

When using the disclosed technique, there is some probability that the application will try to access the data in the host memory before the data is written to the memory by the storage driver. In some embodiments, the storage driver prevents this situation by initially marking the memory locations designated for the data as invalid (also referred to as "dirty"), and clearing this marking (i.e., re-mark the memory locations as valid) only after the data is available and ready in memory. If the application attempts to access the memory locations in questions before the data is ready, a "page fault" will occur and the application will typically retry to access the data at a later time.

In summary, the disclosed techniques reduce the overall data readout latency seen by the application. The reduction in latency is particularly significant when the preparatory actions in the application are long.

System Description

Figure 1:
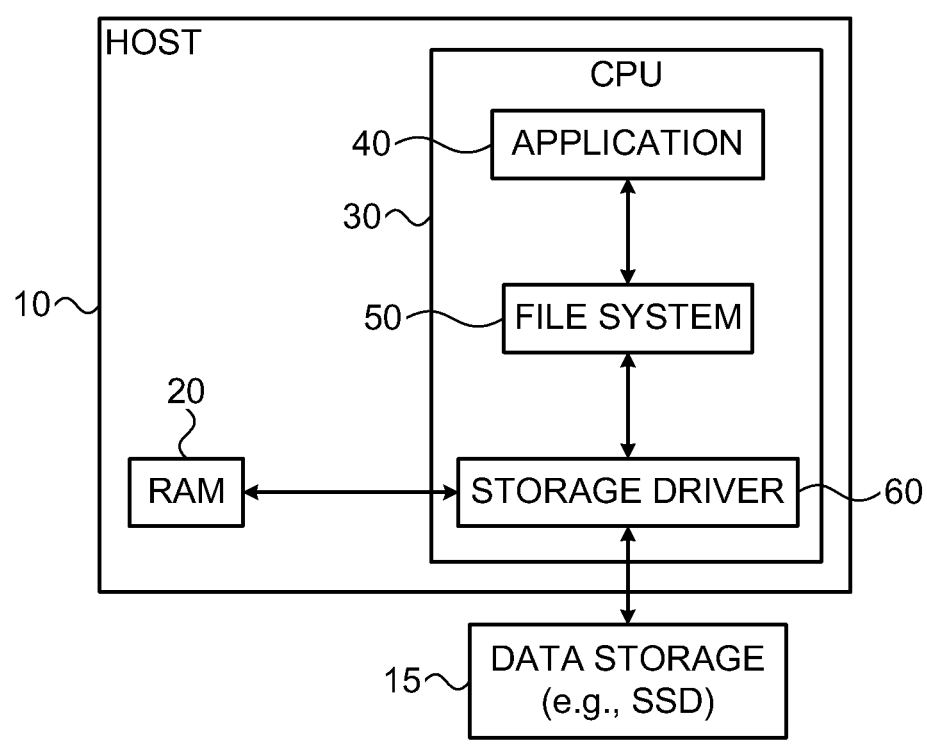
FIG. 1 is a block diagram that schematically illustrates a host device storing data in a data storage device, in accordance with an embodiment of the present invention.

FIG. 1 is a block diagram that schematically illustrates a host device 10 storing data in a data storage device 15, in accordance with an embodiment of the present invention. Host 10 comprises a random access memory (RAM) 20 and a central processing unit (CPU) 30. CPU 30 runs an application 40, which communicates with a file system 50. A storage driver 60 communicates with file system 50, RAM 20, and data storage 15. CPU 30 is also be referred to herein as a processor. In some embodiments, the storage driver runs on a memory management unit (MMU) in the CPU (not shown in the figure).

Host 10 may comprise various kinds of computing devices, laptop computers, cellular phones and smartphones, or any other communication terminals. Data storage 15 may comprise various types of nonvolatile memory (e.g., Flash memory), removable memory modules (sometimes referred to as "USB Flash Drives"), Solid State Drives (SSD), digital cameras, music and other media players and/or any other system or device in which data is stored and retrieved.

Some elements of host 10 may be implemented in hardware, e.g., in one or more Application-Specific Integrated Circuits (ASICs) or Field-Programmable Gate Arrays (FPGAs). Additionally or alternatively, some elements of host 10 can be implemented using software, or using a combination of hardware and software elements. In some embodiments, processor 30 comprises a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Application 40 typically comprises computer software code. The software code and/or data used by the code is stored in data storage 15 prior to execution. The application software, such as enterprise software, accounting software, office suites, graphic software and media players, may perform different tasks for the user. The host device configuration shown in FIG. 1 is an example host device configuration shown for conceptual clarity and not by way of limitation of the embodiments of the present invention.

Reduced-Latency Readout Process

Figure 2:
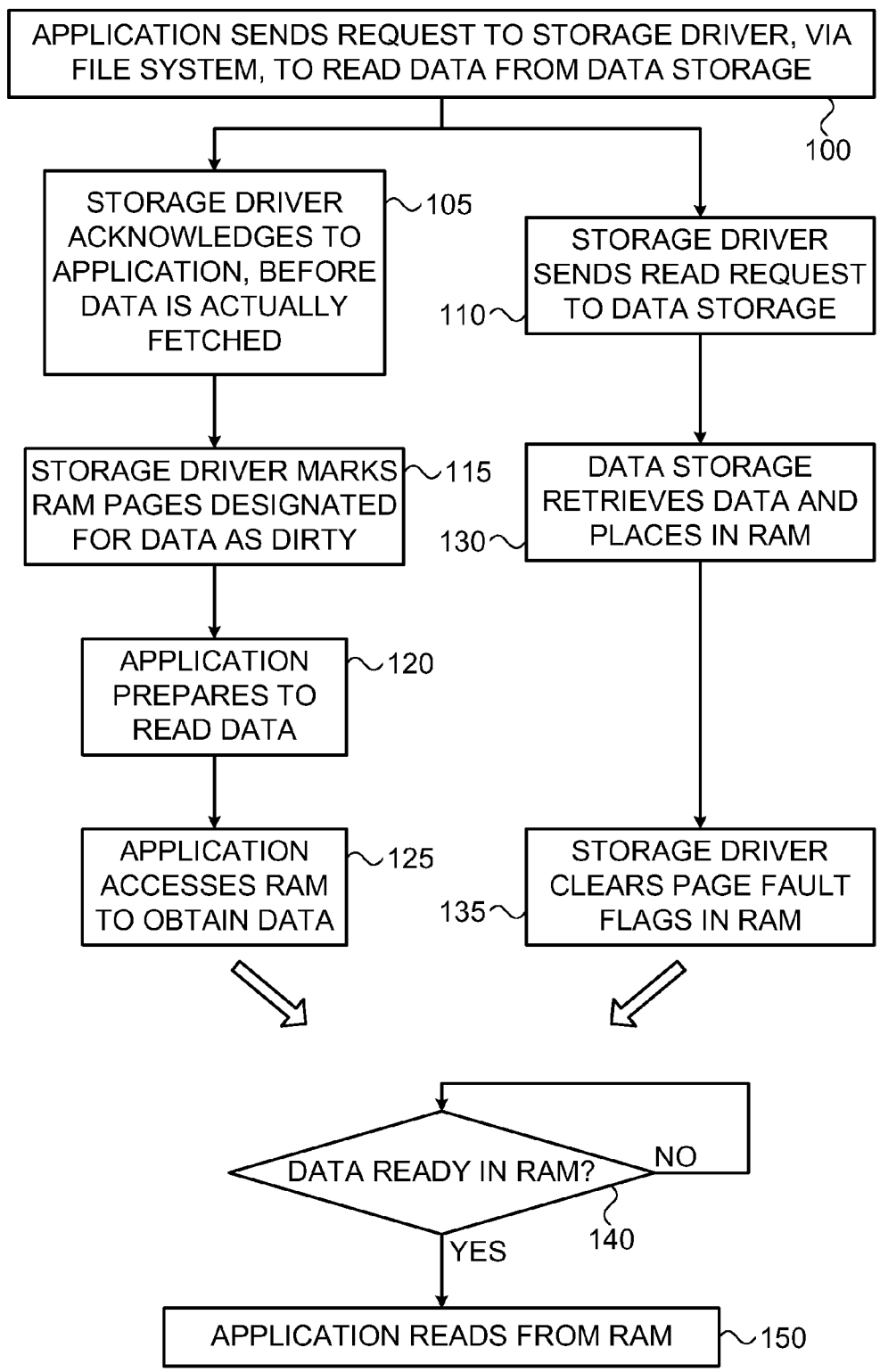
FIG. 2 is a flow chart that schematically illustrates a method for reducing latency in read operations from data storage in a host device, in accordance with an embodiment of the present invention.

FIG. 2 is a flow chart that schematically illustrates a method for reducing latency in read operations from data storage 15 in host device 10, in accordance with an embodiment of the present invention. During operation of application 40 in host 10, application 40 sends a request to storage driver 60 via file system 50, to read data from data storage 15 needed by the application in a first sending step 100.

In an acknowledging step 105, storage driver 60 acknowledges to application 40, before the data is actually fetched, that the data is ready to be used in memory 20. In a second sending step 110, storage driver 60 sends a read request to data storage 15.

Two parallel and competing processes then occur in CPU 30 as steps 110 and 105 are completed. In the first process after acknowledgement step 105, storage driver marks the pages designated for the fetched data in RAM 20 as "dirty" and sets page fault flags to indicate that the data is not ready for the application in a designating step 115. A page fault is typically a built-in function of the operating system that is utilized here to ensure that the application does not access the RAM pages in question before the requested data has been fully fetched. A page fault is an event triggered by the memory management unit (MMU) or other hardware, when the CPU tries to access a memory RAM page that does not contain the physical data that is associated with it.

In a preparing step 120, the application prepares to read the data in RAM after executing all of the application background processes. In an accessing step 125, application 40 then accesses RAM 20 to obtain the data via file system 50.

In the second parallel process, after storage driver sends a read request to data storage 15 in second sending step 110, data storage 15 retrieves the data and places the data in RAM 20 in a retrieving step 130. As RAM 20 fills up the pages marked dirty in step 115 with data from storage 15 for use by application 40, storage driver 60 clears the page fault flags in RAM 20, i.e., marks the RAM pages as valid, at a page fault clearing step 135. Returning from page fault can be implemented using storage driver 60 alone without involving file system 50.

Both parallel processes reach a decision step 140, in which application 40 checks if the data is ready in RAM 20 and fully fetched from storage 15 for use by application 40. If the data is not ready, a "page fault" event is triggered, and the application therefore waits and continues to check if the data is ready. If the data is ready (e.g., if the page fault flags are cleared), application 40 then reads the data from RAM 20, at a readout step 150.

In many practical scenarios, the overall latency is dominated by step 120 (e.g., host overhead) or step 130 (data storage retrieval) in the two parallel processes described above. In the embodiments presented herein, if the latency reduction is governed by the host overhead (e.g., step 120), the data for the application will have been relayed from the data storage to the RAM before the application is ready to use the data.

However if step 130 (data retrieval from the data storage device) is the dominant factor in the overall latency, the data may not be ready in the RAM when the application tries to read it in step 125. In such a case, host 10 utilizes checking the state of the page fault flags so as to ensure that the application will start to read the available data in the RAM in step 150 only after all the data is fetched from the storage and stored in the RAM.

When the page fault flags are cleared, the application can read the fully-fetched data in the RAM. In both cases, however, the latency is reduced using the methods provided herein as will be shown below. The embodiments described herein are particularly advantageous for retrieving multiple parallel data streams from the data storage, e.g., in order to reduce the overall execution time of single-thread applications.

Figure 3:
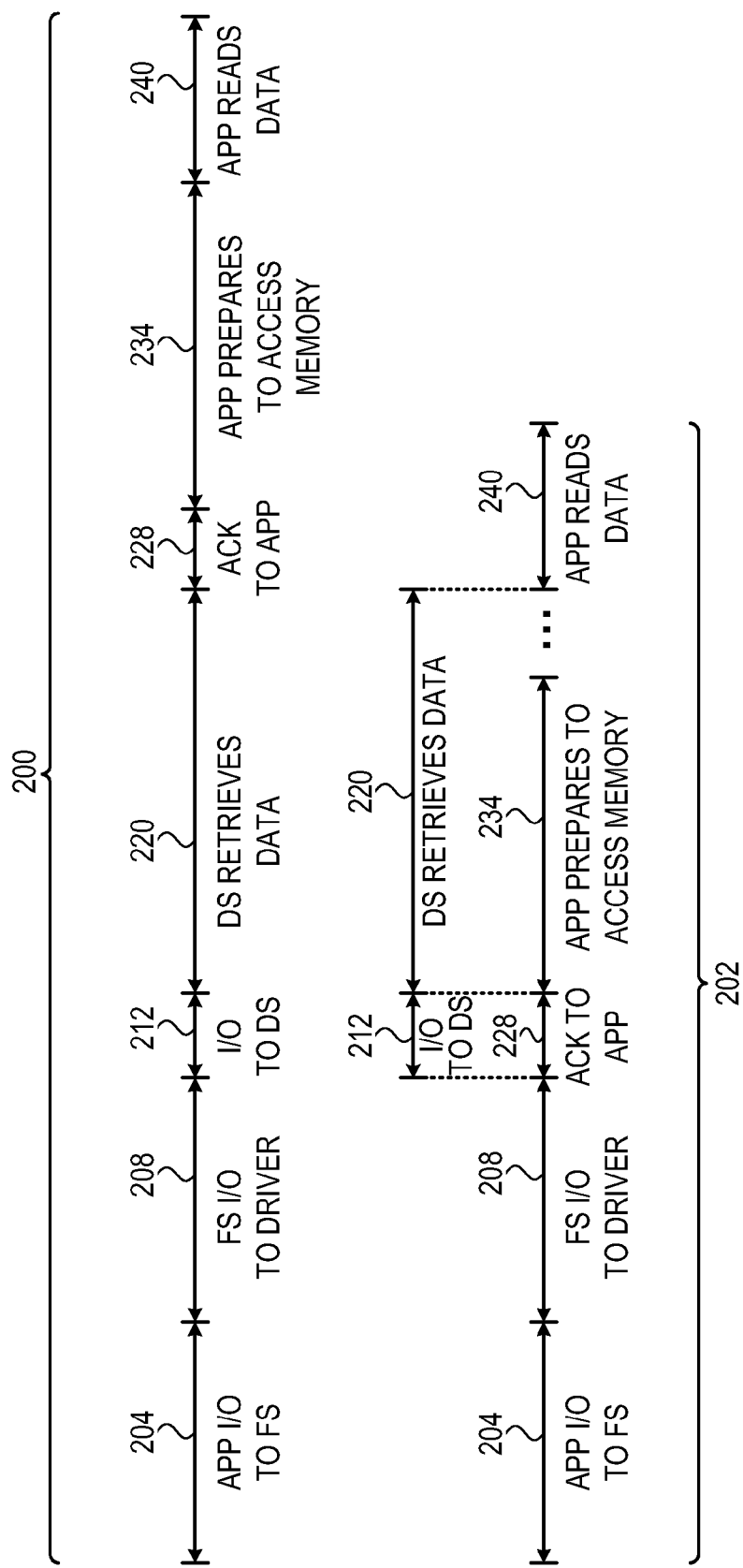
FIG. 3 is a timing diagram that illustrates a method for reducing latency in read operations from data storage in a host device, in accordance with an embodiment of the present invention.

FIG. 3 is a diagram that illustrates a method for reducing latency in read operations from data storage in a host device, in accordance with an embodiment of the present invention. A first timing diagram 200 at the top of the figure illustrates the time intervals of the various processes in reading the data from data storage 15 without using the methods described herein. Here, the host overhead and the data storage processes are serial.

In an APP I/O TO FS time interval 204, application 40 sends a request to read data to file system 50. In a FS I/O TO DRIVER time interval 208, the request is further relayed from file system 50 to storage driver 60. In a I/O TO DS time interval 212, the request is further relayed from storage driver 60 to data storage 15. In a DS RETRIEVES DATA time interval 220, the data storage receives the requested data and places the data in the RAM. In an ACK to APP time interval 228, an acknowledgement is sent from storage driver 60 to application 40 that the data is ready. In an APP PREPARES TO ACCESS MEMORY time interval 234, application 40 prepares to read the received data in RAM 20. In an APP READS DATA time interval 240, application 40 reads the data in RAM 20.

A second timing diagram 202 at the bottom of FIG. 3 illustrates the effect of the latency reduction methods on the overall latency, in accordance with embodiments of the present invention. Here, the host overhead and the data storage processes occur in parallel. The first two processes shown in time intervals 204 and 208 are identical to first timing diagram 200. Subsequently, however, time intervals 228 and 212 are carried out in parallel. Time intervals 228 and 212 correspond to acknowledging step 105 (ACK TO APP) and second sending step 110 (I/O TO DS), respectively. The storage driver sends an acknowledgement to the application that the data is ready, and at the same time requests that the data storage send the data to the RAM.

Timing diagram 202 illustrates the scenario where all of the data from the data storage was not yet fetched from the data storage and relayed to the RAM in time interval 220, but the application is ready to access the memory following time interval 234. The application detects that the page fault flags are still set and waits until the all of the data is fully relayed to the RAM, at which time the page fault flags are cleared. Only at the end of time interval 220, the application reads the data as in time interval 240.

In the opposing scenario described earlier (not shown in FIG. 3) where all of the data is fully fetched and stored in the RAM before the application is ready to read the data, time interval 220 would be shorter than time interval 234. Time interval 240 would start at the end of time interval 234. Nevertheless in both scenarios described above, the overall execution time shown schematically as the overall length of the timing diagram in timing diagram 202 (with latency reduction) is considerably shorter than timing diagram 200 (without latency reduction). The timing diagrams and the length of the time intervals shown in FIG. 3 therein are by way of example, and not by any limitation of the embodiments of the present invention whatsoever.

In many practical cases, the execution of the application involves fetching multiple files from the data storage. Until an acknowledgement is received by the application as in time interval 228, the application is blocked from sending another request for data to the data storage. This blocking mechanism is circumvented with the methods described in the embodiments of the present invention. Returning the acknowledgement to the application in the same overlapping time interval that the request for data is sent to the data storage, e.g., allowing for overlapping time intervals 212 and 228, enables the transfer of the application data from data storage to the RAM in multiple parallel data streams. This method saves considerable management overhead both in terms of runtime and coding complexity. For example, for a single data stream, time interval 220 is 100 μs for a 4 KB I/O. However, time interval 220 may be reduced to several μs, on average, in the case of several concurrent parallel data streams.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. An apparatus comprising:
a memory, wherein the memory is a random access memory (RAM); and
a processor, configured to:
send to a storage device a request from an application to retrieve data from the storage device, so as to cause the data to be transferred from the storage device to the memory in multiple, parallel data streams;
send to the application an acknowledgement that the requested data is available in the memory before the data has been fully transferred from the storage device to the memory;
designate one or more memory locations in the memory for the fetched data, and set page fault flags for each of the one or more memory locations upon sending the acknowledgement and the request; and
when the data is ready in the memory, provide the data to the application, wherein the processor is configured to cause the application to carry out a preparatory action for accessing the data from the memory, wherein the preparatory action is performed in parallel with transferring the data from the storage device to the memory.

2. The apparatus according to claim 1, wherein the processor is configured to clear the page fault flags after the data has been fully transferred from the storage device to the memory.

3. The apparatus according to claim 2, wherein the processor is configured to provide the data to the application only upon verifying that the memory locations are marked as valid.

4. The apparatus according to claim 1, wherein the processor is configured to trigger a page fault event upon detecting that the application attempts to access the memory locations while the memory locations are marked as invalid.

5. A method, comprising:
sending from a processor to a storage device a request from an application to retrieve data from the storage device, so as to cause the data to be transferred from the storage device to a memory coupled to the processor, the data being transferred in multiple, parallel data streams, the memory being a random access memory (RAM);
sending from the processor to the application an acknowledgement that the requested data is available in the memory before the data has been fully transferred from the storage device to the memory, wherein the acknowledgement comprises causing the application to perform a preparatory action for accessing the data from memory, the preparatory action being performed in parallel with transferring the data from the storage device to the memory;
designating one or more memory locations in the memory for the fetched data
setting page fault flags for each of the one or more memory locations upon sending the acknowledgement and the request and
when the fetched data is ready in the memory, providing the data to the application.

6. The method according to claim 5, comprising clearing the page fault flags after the data has been fully transferred from the storage device to the memory.

7. The method according to claim 6, wherein providing the data comprises granting the application access to the data only upon verifying that the memory locations are marked as valid.

8. The method according to claim 5, and comprising triggering a page fault event upon detecting that the application attempts to access the memory locations while the memory locations are marked as invalid.

9. A system, comprising:
a storage device; and
a host, comprising:
a memory, wherein the memory is a random access memory (RAM); and
a processor configured to:
send to the storage device a request from an application to retrieve data from the storage device so as to cause the data to be transferred in multiple, parallel data streams from the storage device to the memory;
send to the application an acknowledgement that the requested data is available in the memory before the data has been fully transferred from the storage device to the memory;
designate one or more memory locations in the memory for the fetched data, and set page fault flags for each of the one or more memory locations upon sending the acknowledgement and the request; and
when the fetched data is ready in the memory, to provide the data to the application;
wherein the processor is further configured to cause the application to perform a preparatory action for accessing the data from memory, wherein the processor is configured to perform the preparatory action in parallel with the transfer of data from the storage to the memory.

10. The system according to claim 9, wherein the processor is configured to clear the page fault flags after the data has been fully transferred from the storage device to the memory.

11. The system according to claim 10, wherein the processor is configured to provide the data to the application only upon verifying that the memory locations are marked as valid.

12. The system according to claim 9, wherein the processor is configured to trigger a page fault event upon detecting that the application attempts to access the memory locations while the memory locations are marked as invalid.

* * * * *